United States Patent [19]

Shiraki

[11] Patent Number: 5,069,477
[45] Date of Patent: Dec. 3, 1991

[54] PAD FOR AIR BAG DEVICE

[75] Inventor: Kouji Shiraki, Gifu, Japan

[73] Assignee: Toyoda Gosei Co., Ltd., Nishikasugai, Japan

[21] Appl. No.: 569,917

[22] Filed: Aug. 20, 1990

[30] Foreign Application Priority Data

Oct. 30, 1989 [JP] Japan .............................. 1-126748[U]

[51] Int. Cl.⁵ .............................................. B60R 21/16
[52] U.S. Cl. .................................... 280/732; 280/731; 280/743
[58] Field of Search ........................ 280/731, 732, 743

[56] References Cited

U.S. PATENT DOCUMENTS

| 4,148,503 | 4/1979 | Shiratori et al. | 280/731 |
| 4,334,699 | 6/1982 | Patzelt et al. | 280/731 |
| 4,836,576 | 6/1989 | Werner et al. | 280/731 |
| 4,852,907 | 8/1989 | Shiraki et al. | 280/731 |
| 4,878,689 | 11/1989 | Mitzkus et al. | 280/731 |

FOREIGN PATENT DOCUMENTS 51-25342 2/1976 Japan .
63-199149 8/1988 Japan .

Primary Examiner—Kenneth R. Rice
Attorney, Agent, or Firm—Cushman, Darby & Cushman

[57] ABSTRACT

A pad for covering an inflatable air bag for use in an air bag device includes an insert member of a generally box-shape made of a synthetic resin. The insert member has an upper wall openable upon inflation of the air bag and four side walls extending downwardly from an peripheral edge of the upper wall. A reinforcing metallic member is embedded in at least the front and rear side walls of the insert member. A covering member made of a soft synthetic resin covers the insert member.

9 Claims, 5 Drawing Sheets

PAD FOR AIR BAG DEVICE

BACKGROUND OF THE INVENTION

This invention relates to a pad covering an air bag for use in an air bag device mounted on an automobile or the like, the air bag being inflatable when the need arises.

A conventional pad for use in an air bag device of this type, as disclosed in Japanese Utility Model Unexamined Publication No. 51-25342 and Japanese Patent Unexamined Publication No. 63-199149, is of a two-layered construction which comprises a covering layer of a soft synthetic resin provided at the outer side of the pad, and an insert portion provided at the inner side, the insert portion being made of a more rigid synthetic resin than the synthetic resin of the covering layer.

In such a conventional pad, the insert portion serves to retain the shape of the covering layer, and the side wall of the insert portion serves as a mounting portion for attaching the pad to the body of the air bag device. The insert portion further serves to prevent the upper wall of the pad from separating completely from the peripheral side wall of the pad when that upper wall is broken along a weakened portion and is unfolded upon inflation of the air bag. Therefore, the insert portion requires a predetermined rigidity and a tensile strength so as to serve these purposes.

However, in order to allow the upper wall of the pad to be easily unfolded following breakage of the upper wall thereof, the insert portion must also have flexibility in addition to having a relative rigidity and the high tensile strength. For this reason, the range of choice with respect to the shape and material of the insert portion has been considerably narrow, so that much time and labor has been required to select a proper shape and resin material for the insert portion.

SUMMARY OF THE INVENTION

It is therefore an object of this invention to provide a pad for an air bag device which overcomes the above problems of the prior art.

Another object of the invention is to provide a pad for an air bag device in which an insert portion or member of the pad has the proper strength and the ability to allow of the upper wall of the pad to unfold easily when the upper wall is broken upon inflation of the air bag, and the range of choice with respect to a shape and resin material of the insert portion is expanded, and the freedom of design of the insert portion is enhanced.

According to the present invention, there is provided a pad for covering an inflatable air bag for use in an air bag device, comprising:

(a) an insert member of a generally box-shape made of a synthetic resin and having an upper wall openable upon inflation of the air bag, and four side walls extending downwardly from an peripheral edge of the upper wall;

(b) a reinforcing member made of metal and embedded in at least front and rear side walls of the insert member; and (c) a covering member made of a soft synthetic resin to cover the insert member.

In the pad of the present invention for an air bag device, thin-walled reinforcing members of metal having relatively high tensile strength and flexibility are embedded in the insert member over a region extending respectively from those sections near fulcrum portions (about which the upper wall portions of the insert member are opened upon inflation of the air bag) to those sections of the side wall portions connected to the body of the air bag.

Therefore, the provision of the thin-walled metal reinforcing members, which are not bulky, gives the insert member tensile strength and flexibility over the region thereof extending respectively from those sections near the fulcrum portions to those sections of the side wall portions connected to the air bag device body. Therefore, when selecting a shape and a material for the insert member, it is only necessary to consider the thickness and shape of the insert member more rigid than the covering layer, the material of the insert member, etc., so as to retain the soft covering layer. Thus, the choice of the shape and material of the insert member can be made easily, thereby enhancing the freedom of design of the insert member.

DESCRIPTION OF THE PREFERRED EMBODIMENTS OF THE INVENTION

The invention will now be described with reference to the accompanying drawings.

Figure 1:
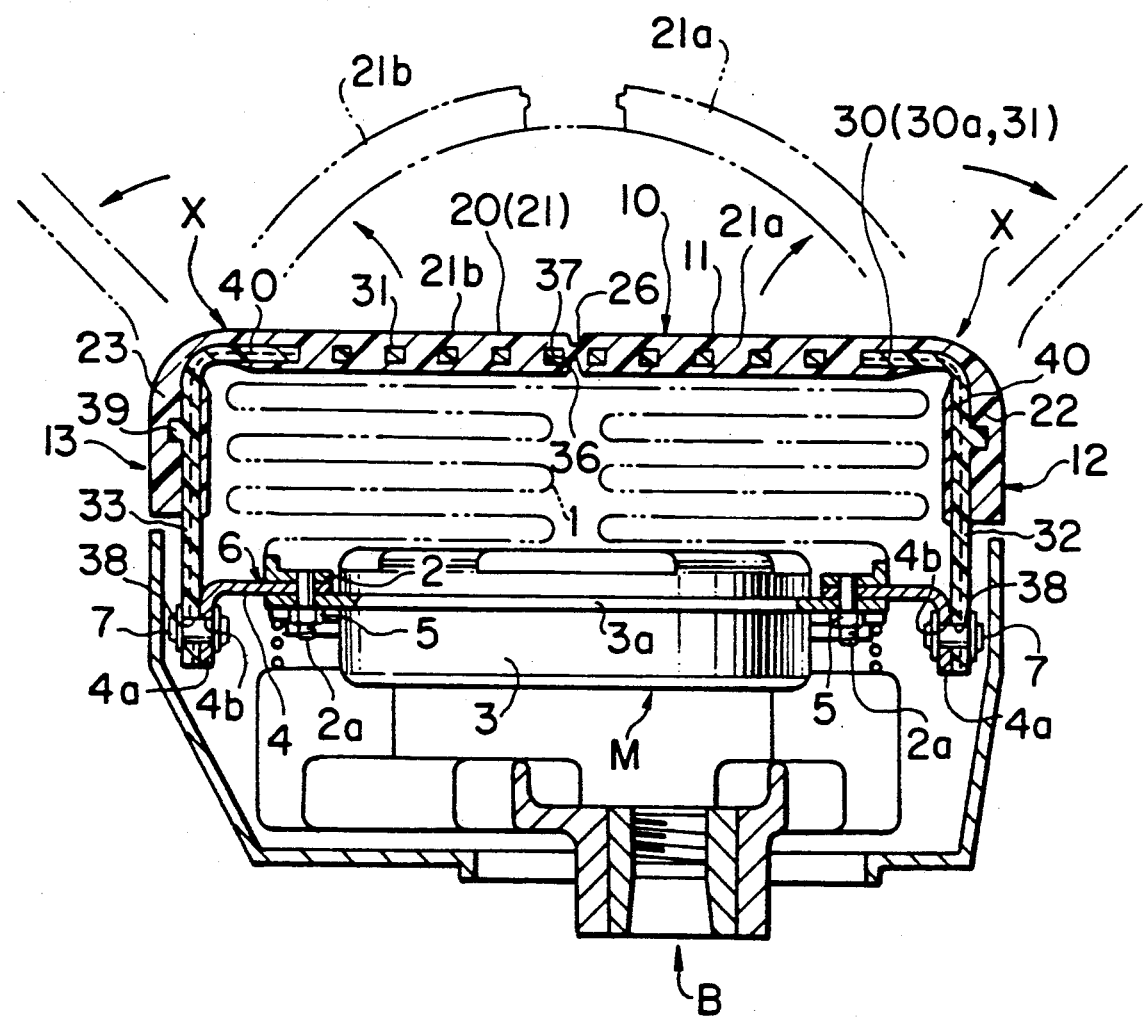
FIG. 1 is a cross-sectional view of a pad provided in accordance with an embodiment of the present invention, showing the manner of use of this pad.
Figure 2:
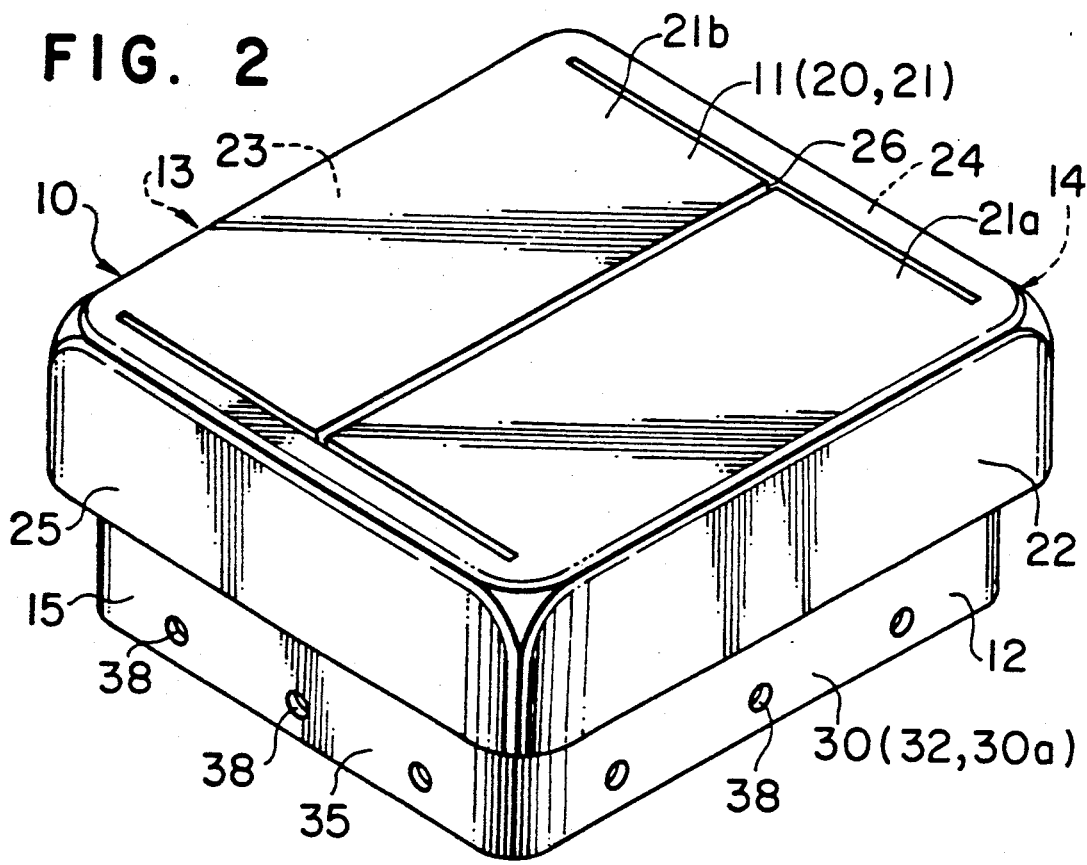
FIG. 2 is a perspective view of the pad shown in FIG. 1.

As shown in FIGS. 1 and 2, a pad 10 embodying the present invention is arranged to cover an air bag 1 provided at a boss B of a steering wheel. The pad 10 is of a generally parallelepipedic box-shape, and has an upper wall 11 of a generally rectangular shape, and four side walls 12, 13, 14 and 15 extending downwardly from the peripheral edge of the upper wall 11. A covering layer 20 is formed on a surface of an insert member 30 by injection molding (rim molding). In the illustrated embodiment, in order to prevent the covering layer 20 from separating from the insert member 30, the covering layer 20 is arranged to partly cover the inner surface of the insert member 30.

The covering layer 20 is made of a soft synthetic resin such as urethane, and has an upper wall portion 21 and side wall portins 22, 23, 24 and 25 extending downwardly from the peripheral edge of the upper wall portion 21, such that the covering layer 20 forms the profile of the pad 10. A weakened portion 26 of a reduced thickness, formed in generally an H-shape as viewed from above, is provided at the upper wall portion 21. The weakened portion 26 can be easily broken upon inflation of the air bag, so that openable portions 21a and 21b of the upper wall portion 21 can be opened away from each other in forward and rearward directions with respect to the steering wheel.

Figure 3:
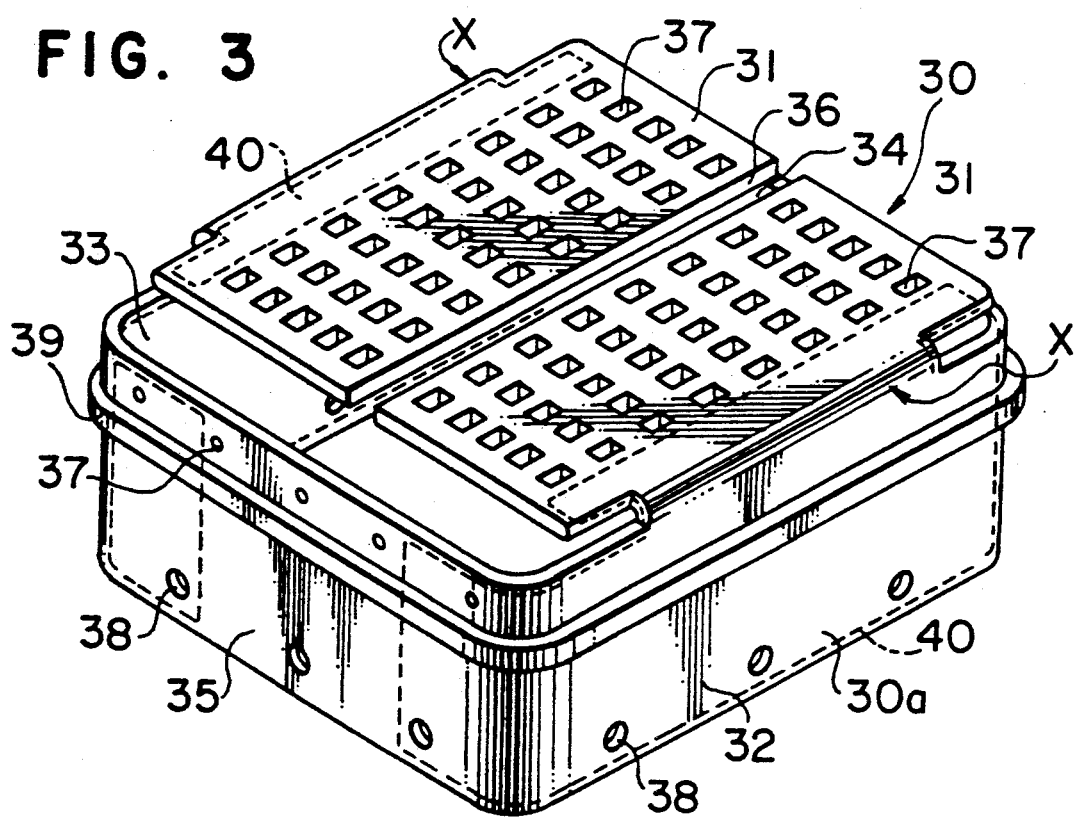
FIG. 3 is a perspective view of an insert member of the pad shown in FIG. 1.

As shown in FIGS. 1 to 3, the insert member 30 comprises a metallic net 40 (thin metal material), and a resin body 30a which is made of a more rigid synthetic resin than urethane constituting the covering layer 20. Examples of such rigid synthetic resin include a polyamide resin, a vinyl chloride resin, and a polyolefin resin. The resin body 30a has side wall portions 32, 33, 34 and 35 embedded respectively in the side walls 12, 13, 14 and 15 of the covering layer 20, and a slit 36 is formed through an upper wall of the resin body 30a to divide the same into two upper wall portions 31 and 31 which extend respectively from the side wall portions 32 and 33 and are embedded respectively in the openable portions 21a and 21b of the covering layer 20. The slit 36 enables an easy breakage of the upper wall portion 21 of the covering layer 20.

Each of the two upper wall portions 31 and 31 of the insert member 30 has a number of through holes or perforations 37 through which the resin material of the covering layer 20 extends, thereby preventing the covering layer 20 from separating from the upper wall portions 31 and 31. Also, each of the side wall portions 34 and 35 has a plurality of through holes 37 in order to prevent the covering layer 20 from separating from the side walls 34 and 35. The lower sections of the side wall portions 32 to 35 project downwardly beyond the side walls 22 to 25 of the covering layer 20, respectively. A plurality of mounting holes 38 are formed through each of these lower sections, and each of these lower sections is adapted to be fixedly secured to a bag holder 4 of an air bag device body 6 by rivets 7 passing respectively through the mounting holes 38.

A reinforcing rib 39 is formed on the side wall portions 32 to 35 and extends around the periphery of the resin body 30a of the insert member 30.

The insert member 30 has two fulcrum portions X about which the two upper portions 31 and 31 are respectively turned upward or opened upon inflation of the air bag 1. The two sections of the metallic net (thin metallic material) 40 are embedded in the resin body 30a of the insert member 30, and extend respectively from the regions near the fulcrum portions X to the side wall portions 32 and 33 adapted to be secured to the bag holder 4. The metallic net 40 is woven of a thin iron wire or the like, and has relatively high tensile strength and a high degree of flexibility. In this embodiment, the net 40 is woven of an iron wire having a diameter of 0.5 mm. The resin body 30a of the insert member 30 is reduced in thickness at the fulcrum portions X.

In this embodiment, the shape, the thickness, the material, etc., of the resin body 30a of the insert member 30 are determined with only the purpose of retaining the shape of the soft covering layer 20 in mind.

A method of forming the pad 10 will now be described. First, the insert member 30 is formed by injection molding, using the metallic net 40 as inserts. Then, the insert member 30 is placed in an injection mold (rim mold), and the mold is clamped, and a predetermined molding material is poured into a cavity of the mold to mold the covering layer 20, thereby forming the pad 10. Since the resin body 30a of the insert member 30 is so designed as to retain the shape of the covering layer 20, the insert member 30 can be easily set in the mold for molding the covering layer 20.

As shown in FIG. 1, the air bag device M, to which the pad 10 of this embodiment is applied, comprises the air bag 1, accommodated in a folded condition, the pad 10 covering the air bag 1, an inflator 3 for supplying gas to the air bag 1 when the need arises, and the bag holder 4 holding the pad 10, the air bag 1 and the inflator 3.

In assembling the air bag device body 6 with the air bag 1 and the inflator 3 mounted to the bag holder 4, bolts 2a, projecting from an annular retainer 2, are passed through the periphery of an opening of the air bag 1, the bag holder 4 and a flange 3a of the inflator 3, and nuts 5 are threaded respectively on the lower ends of the bolts 2a projecting from the lower surface of the flange 3a of the inflator 3. For attaching the pad 10 to the bag holder 4 of the air bag device body 6, blind rivets 7 adapted for fastening from one ends thereof are passed through the respective mounting holes 38 in the side wall portions 32 to 35 of the insert member 30 and respective mounting holes 4b formed through a side wall 4a of the bag holder 4, and are fastened to them.

Fastening means such as bolts and nuts are provided on the right and left side portions (disposed perpendicular to the plane of FIG. 1) of the bag holder 4, and the bag holder 4 is fastened by such fastening means to a core member or the like of the steering wheel body.

Since the resin body 30a of the insert member 30 is designed to retain the shape of the covering layer 20 after the air bag device M is attached to the steering wheel body, the pad 10 is retained in a predetermined shape in a normal condition.

When the air bag 1 is to be inflated, the weakened portion 26 of the covering layer 20 provided at the upper wall 11 of the pad 10 is broken or ruptured, so that the openable portions 21a and 21b of the covering layer 20, as well as the pair of upper wall portions 31 and 31 of the insert member 30, are opened upward away from each other to allow the air bag 1 to fully inflate.

The resin body 30a of the insert member 30 is reduced in thickness at the fulcrum portions X, and the pair of metallic nets 40, having high tensile strength relative flexibility, are embedded in the body 30a over the region extending respectively from those sections near the fulcrum portions X to those sections of the side wall portions 32 and 33 connected to the bag holder 4. With this arrangement, the pair of upper wall portions 31 and 31 of the insert member 30 can be easily opened, together with the openable portions 21a and 21b of the covering layer 20, without being damaged or broken.

Therefore, the provision of the thin metallic nets 40 which are not bulky, gives the insert member 30 tensile strength and flexibility over the region thereof extending respectively from those sections near the fulcrum portions X to those sections of the side wall portions 32 and 33 connected to the air bag device body 6. Therefore, the shape and material of the resin body 30a of the insert member 30 can be selected from a large spectrum of materials with the only condition being that the resin body 30a must be more rigid than the covering layer 20 so as to retain the shape of the covering layer 20. Thus, the choice of the shape and material of the resin body 30a of the insert member 30 can be made easily, thereby enhancing the freedom of design of the insert member 30.

Figure 4:
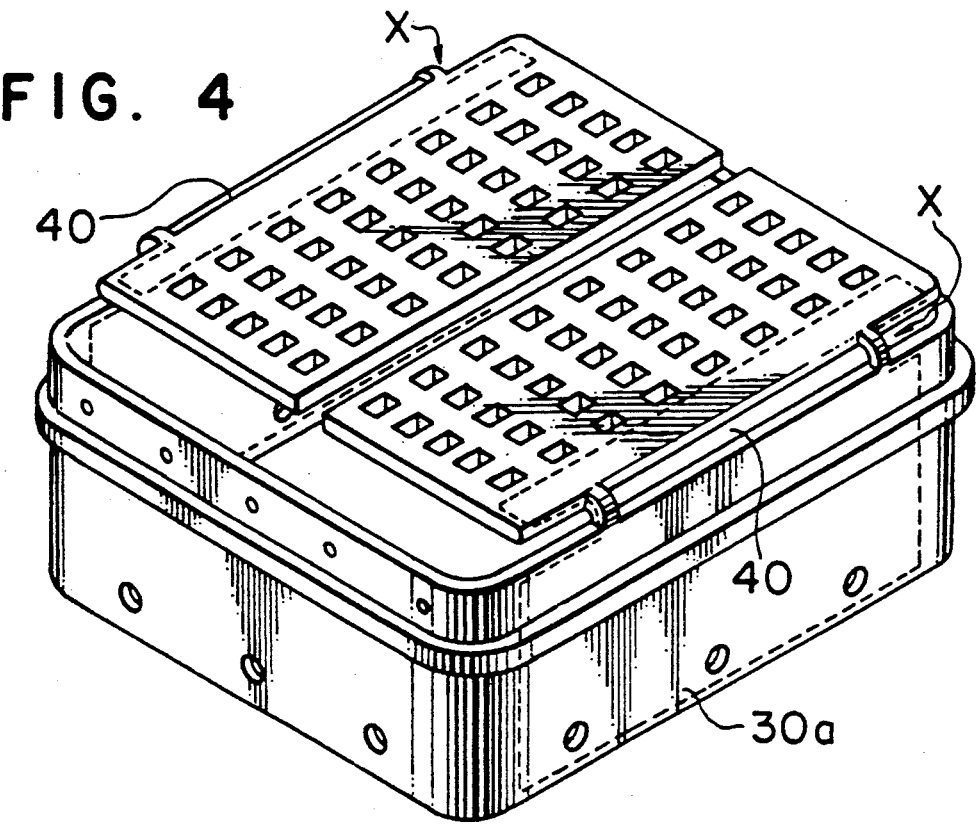
FIG. 4 is a perspective view of an insert member according to another embodiment of the invention.
Figure 8:
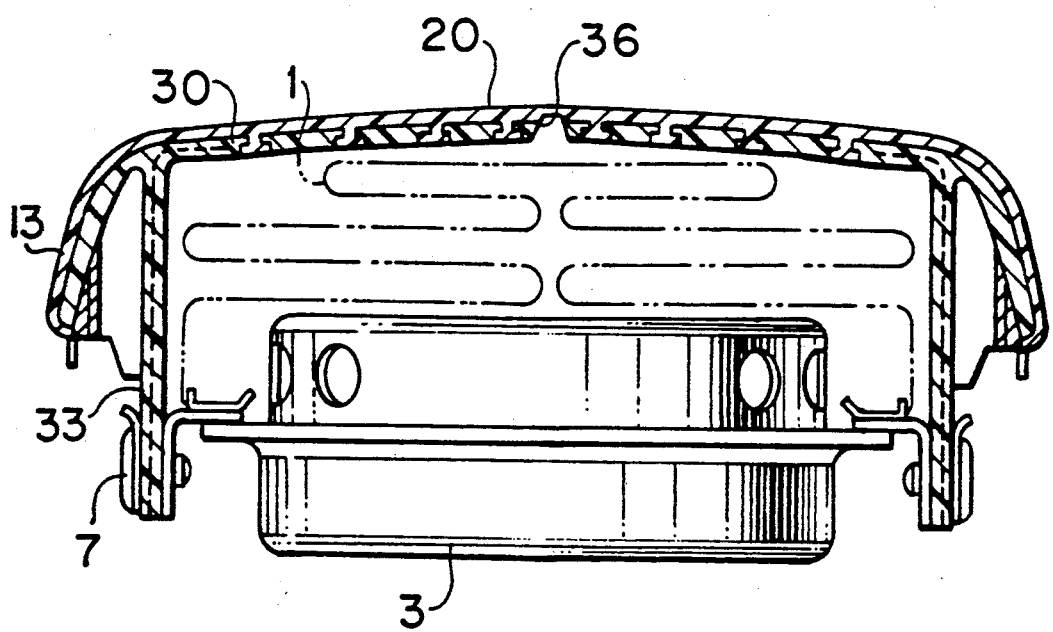
FIG. 8 is a fragmentary cross-sectional view of a pad according to another embodiment of the invention.

For example, the pad 10 may have a double-frame construction, as shown in FIG. 8, such that the resin body 30a is made of thermoplastic urethan (TPV), and the covering layer 20 is made of soft PCV. In this case, the side wall portions 32 to 35 of the inner frame can be reduced in thickness, and the pad 10 can be formed into any desired profile by the side walls 12 to 15 of the outer frame.

Where the resin body 30a is made of a much more rigid synthetic resin than the material of the covering layer 20, the fulcrum portions X of the resin body 30a must be even thinner than the remaining portions. To meet this requirement, the resin body 30a may be provided partially at each of the fulcrum portion X, as shown in FIG. 4, or the resin body 30a may be dispensed with at each fulcrum portion X.

Figure 5:
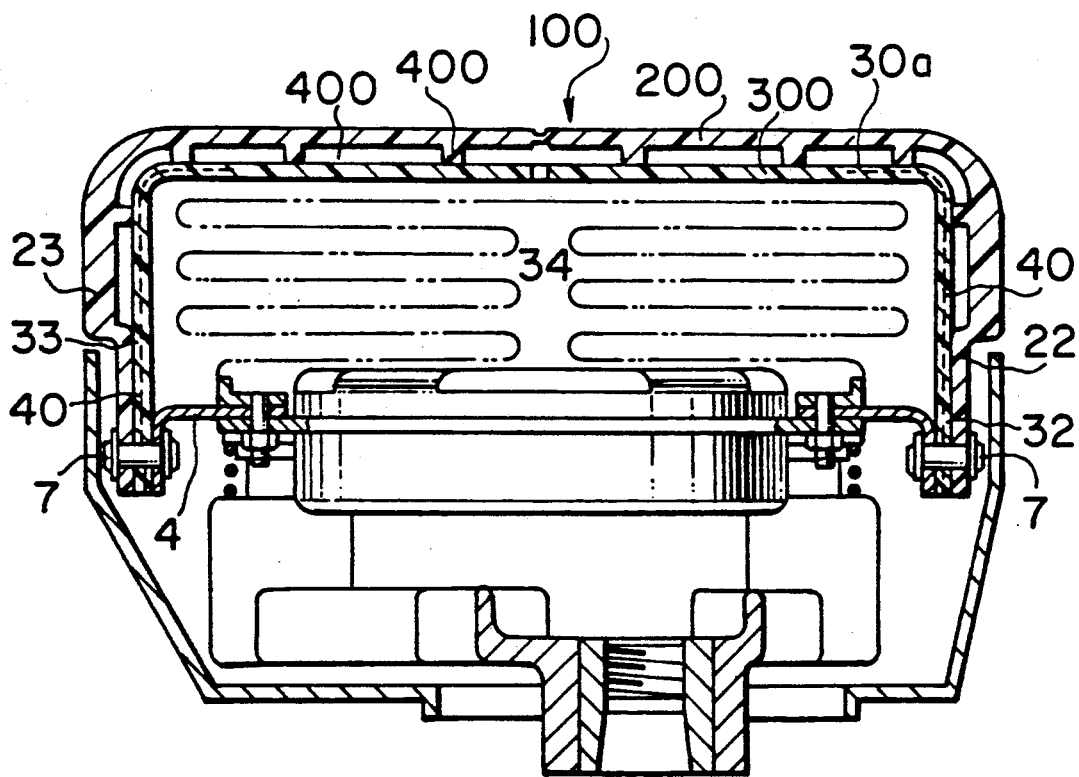
FIG. 5 is a view similar to FIG. 1, but showing a pad according to a further embodiment of the invention.
Figure 6:
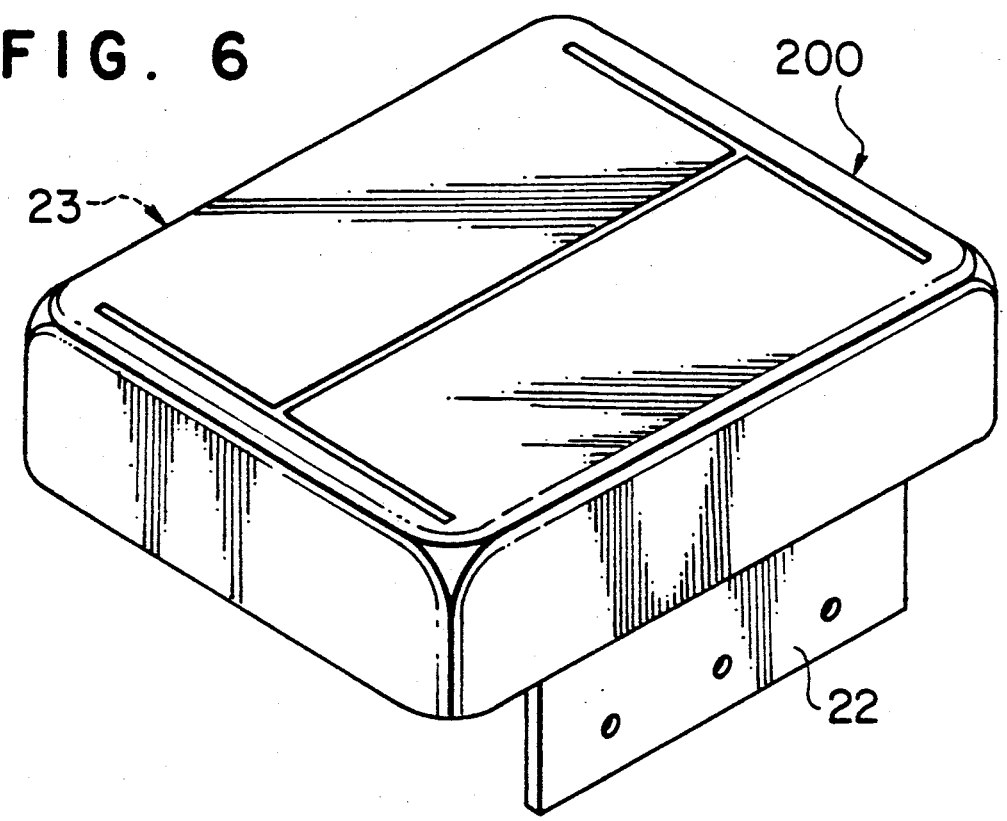
FIG. 6 is a perspective view of a covering layer of the pad of FIG. 5.
Figure 7:
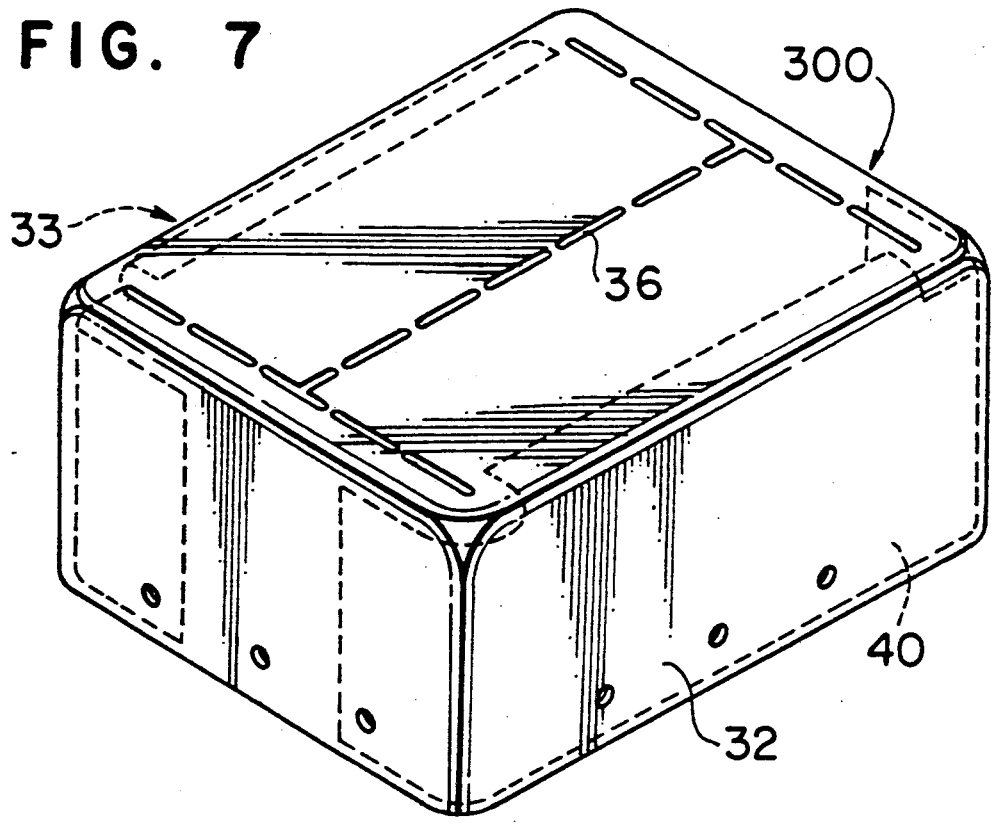
FIG. 7 is a perspective view of an insert member of the pad of FIG. 5.

In the pad 10 of the embodiment, the covering layer 20 is injection-molded with the insert member 30 placed in the predetermined mold, as described above. The present invention can be applied to a pad 100 (FIGS. 5 to 7) in which a covering layer 200 and an insert member 300 are separately provided. This construction can reduce the manufacturing cost of the pad 100. In the pad 100, when side wall portions 32 and 33 of the insert member 300 having the metallic net 40 embedded therein are to be secured to the bag holder 4 by rivets 7, side wall portions 22 and 23 of the covering layer 200 are clamped by the rivets 7, together with the side wall portions 32 and 33, thereby connecting the covering layer 200 and the insert member 300 together. A plurality of slits 36, constituting a weakened portion, are formed in the insert member 300 in a discrete or stitched manner, and therefore opposed ends of upper wall portions 31 and 31 are not extended downward. Further, ribs 400 are formed between the covering layer 200 and the insert member 300, thereby preventing the covering layer 200 from partially falling toward the insert member 300. The ribs 400 are integrally formed on one of the covering layer 200 and the insert member 300.

Although in the pad 10, a single sheet of metallic net 40 is embedded in the insert member 30 over the region extending from each of the upper wall portions 31 to the corresponding side wall portion 32 or 33, such single sheet of metallic net 40 may be replaced by a plurality of sheets of metallic net spaced from one another in the right and left direction.

Further, although in the pad 10, each of the thin metallic materials embedded in the insert member 30 comprises the metallic net 40 woven of an iron wire or the like, this thin metallic material may be a metallic plate of iron or the like having a thickness of about 0.5 mm to 1.0 mm, or such a metallic plate having a number of perforations therethrough.

What is claimed is:

1. A pad for covering an inflatable air bag for use in an air bag device, comprising:
    an insert member of a generally box-shape made of a synthetic resin and having an upper wall openable upon inflation of the air bag and side walls extending downwardly from a peripheral edge of said upper wall;
    a covering member made of synthetic resin having ribs formed on an underside thereof positioned such that said ribs contact said insert member upper wall so as to define a gap between said covering member underside and said insert member upper wall, said covering member further including a weakened portion.

2. A pad as set forth in claim 1, wherein said insert member upper wall includes a plurality of flaps which are connected to one another by an insert member weakened portion.

3. A pad as set forth in claim 2, wherein said insert member weakened portion member comprises discrete slits.

4. A pad as set forth in claim 2, wherein said flaps are connected to said side walls by said insert member weakened portion.

5. A pad as set forth in claim 2, wherein said covering member weakened portion comprises discrete slits.

6. A pad as set forth in claim 2, wherein said covering member is secured at a plurality of locations on said insert member side walls.

7. A pad as set forth in claim 6, wherein a metallic reinforcing member is embedded in said side walls securing thereto said covering member.

8. A pad as set forth in claim 7, further comprising a means for fastening said covering member and said insert member to said air bag device.

9. A pad as set forth in claim 7, wherein said reinforcing member is embedded in both said side walls and said upper wall through said peripheral edges of said insert member.

* * * * *